(12) United States Patent
Park

(10) Patent No.: US 11,580,087 B2
(45) Date of Patent: Feb. 14, 2023

(54) BLOCKCHAIN GENERATION SYSTEM AND METHOD FOR OPERATING THE SAME

(71) Applicants: Hyundai Motor Company, Seoul (KR); Kia Motors Corporation, Seoul (KR)

(72) Inventor: Kyung Dong Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 88 days.

(21) Appl. No.: 17/103,314

(22) Filed: Nov. 24, 2020

(65) Prior Publication Data

US 2021/0182265 A1  Jun. 17, 2021

(30) Foreign Application Priority Data

Dec. 13, 2019 (KR) .................. 10-2019-0166990

(51) Int. Cl.
*G06F 16/27* (2019.01)
*G06F 16/23* (2019.01)
*G06F 16/2455* (2019.01)

(52) U.S. Cl.
CPC ...... *G06F 16/2315* (2019.01); *G06F 16/2455* (2019.01); *G06F 16/27* (2019.01)

(58) Field of Classification Search
CPC ... G06F 16/2315; G06F 16/27; G06F 16/2455
USPC ........................................................ 707/803
See application file for complete search history.

(56) References Cited

U.S. PATENT DOCUMENTS

| 10,558,825 | B1* | 2/2020 | Suh ..................... H04L 9/3239 |
| 10,713,239 | B2* | 7/2020 | Qiu ..................... G06F 16/212 |
| 10,928,803 | B2* | 2/2021 | Biernat ............. G05B 19/4093 |
| 11,176,550 | B2* | 11/2021 | Vintila ................. H04L 9/0825 |
| 11,196,552 | B2* | 12/2021 | Parker .................... H04L 9/321 |
| 2017/0235970 | A1* | 8/2017 | Conner ............. G06F 16/2358 707/690 |
| 2018/0294955 | A1* | 10/2018 | Rhie ....................... G06F 16/27 |
| 2018/0323964 | A1* | 11/2018 | Watanabe .............. G06F 16/27 |
| 2019/0018863 | A1* | 1/2019 | Wu ..................... G06F 16/1805 |
| 2019/0044714 | A1* | 2/2019 | Parker ............... G06F 16/1805 |

(Continued)

FOREIGN PATENT DOCUMENTS

KR  2018-0117119 A  10/2018
KR  2018-0124545 A  11/2018

(Continued)

*Primary Examiner* — Hanh B Thai
(74) *Attorney, Agent, or Firm* — Fox Rothschild LLP

(57) ABSTRACT

A blockchain generation system included in each of servers forming a blockchain network includes a blockchain condition setting device that sets a blockchain configuration condition statement based on an operator's input to a screen of a user interface. A data detector detects result data stored in a memory of a programmable logic controller according to an operation of a process equipment based on the blockchain configuration condition statement. A blockchain generator generates blockchain data based on the result data detected from the memory of the programmable logic controller and transmits the blockchain data to a plurality of client servers connected via the blockchain network. A storage device stores the blockchain data and store blockchain data received from the client servers.

13 Claims, 7 Drawing Sheets

(56) References Cited

U.S. PATENT DOCUMENTS

| | | | |
|---|---|---|---|
| 2019/0050856 A1* | 2/2019 | Vintila | G06F 16/27 |
| 2019/0058590 A1* | 2/2019 | Watanabe | H04L 9/321 |
| 2019/0132350 A1* | 5/2019 | Smith | G06F 21/577 |
| 2019/0146946 A1* | 5/2019 | Zhang | G06F 16/113 |
| | | | 707/667 |
| 2019/0251187 A1* | 8/2019 | Lin | G06F 16/16 |
| 2019/0324958 A1* | 10/2019 | Ow | H04L 9/0637 |
| 2019/0339678 A1* | 11/2019 | Biernat | G05B 19/41865 |
| 2019/0340269 A1* | 11/2019 | Biernat | H04L 9/50 |
| 2019/0391979 A1* | 12/2019 | Bistram | G06F 16/27 |
| 2020/0026700 A1* | 1/2020 | Qiu | G06F 16/27 |
| 2020/0042513 A1* | 2/2020 | Shima | G06F 16/2379 |
| 2020/0151266 A1* | 5/2020 | Takeuchi | G06F 16/2379 |
| 2020/0202429 A1* | 6/2020 | Celia | G06Q 30/0201 |
| 2020/0226123 A1* | 7/2020 | Nixon | H04L 9/3297 |
| 2020/0228316 A1* | 7/2020 | Cahill | H04L 9/3297 |
| 2021/0026740 A1* | 1/2021 | Guo | G06Q 20/223 |
| 2021/0049600 A1* | 2/2021 | Spector | H04L 9/085 |

FOREIGN PATENT DOCUMENTS

| | | |
|---|---|---|
| KR | 2019-0012969 A | 2/2019 |
| KR | 101950856 B1 | 2/2019 |
| KR | 101957917 B1 | 3/2019 |
| KR | 2019-0036948 A | 4/2019 |
| KR | 101968424 B1 | 4/2019 |
| KR | 101977178 B1 | 5/2019 |

* cited by examiner

■ Node list

| Order | Node name | Selection item | DB access IP | LOT name address | LOT name | Collection condition address | PLC type | Whether to set | Setting date and time |
|---|---|---|---|---|---|---|---|---|---|
| 1 | 000 | PLC | 55.101.22.11 | 0 X 01 | 2028323 | 0 X 07 | Melsec | Completion | 2018-11-13 12:22:12 |
| 2 | 000 | PLC | 55.101.22.12 | - | 2037302 | 0 X 07 | Melsec | Completion | 2018-11-21 08:32:11 |
| 3 | 000 | PLC | 55.101.22.13 | 0 X 01 | 3037372 | 0 X 07 | Melsec | Completion | 2018-10-27 17:04:22 |
| 4 | 000 | PLC | NONE | - | 3037372 | 0 X 07 | Melsec | Completion | 2018-09-24 09:32:52 |
| 5 | 000 | DB | 55.101.22.14 | - | | 0 X 07 | Melsec | Completion | 2018-08-16 13:22:11 |

BLOCKCHAIN GENERATION SYSTEM AND METHOD FOR OPERATING THE SAME

CROSS-REFERENCE TO RELATED APPLICATION

This application claims priority to and the benefit of Korean Patent Application No. 10-2019-0166990 filed on Dec. 13, 2019, the entire contents of which are incorporated herein by reference.

BACKGROUND

(a) Field of the Invention

The present disclosure relates to a blockchain generation system and a method for operating the same, and more particularly, to a blockchain generation system and a method for operating the same that store data generated by checking a state of a memory of process equipment installed in an industrial site in a blockchain network in real time.

(b) Description of the Related Art

In general, automotive companies operate a plurality of factories by region to produce vehicles or vehicle parts, and receive parts produced by numerous cooperators and use the parts for vehicle production. If defective parts or defects in assembly that are not detected during an assembly process of a vehicle in an industrial site occur, product quality is adversely affected, after-sales maintenance costs occur, and a problem of safety of a customer occurs. Therefore, in the industrial site, quality inspections of parts of the vehicle are checked and the assembly defects are verified through inspections processes of a production line of the vehicle.

However, there is a limit in managing and supervising each process individually due to a type and a quantity of parts applied to the vehicle are vast. For example, the parts of the vehicle are related to machinery, electronics, electricity, communication, optics, chemicals, or software. For example, each process may not be individually managed and supervised when the vehicle is produced after a person in charge forges or modifies defective parts in the inspection process or the defective parts is not detected. In addition, since it is difficult to determine a cause of the above problem, it takes a considerable amount of time to find a solution. Thus, there is a problem that causes quality deterioration and customer complaints.

The above information disclosed in this section is merely for enhancement of understanding of the background of the disclosure, and therefore it may contain information that does not form the prior art that is already known in this country to a person of ordinary skill in the art.

SUMMARY

The present disclosure has been made in an effort to provide a blockchain generation system and a method for operating the same that detect condition statement data in a programmable logic controller (PLC) memory that stores data of process equipment operated by processes in an industrial site and store the condition statement data through a blockchain network.

An exemplary embodiment of the present disclosure may provide the blockchain generation system, including: a blockchain condition setting device configured to set a blockchain configuration condition statement based on an operator's input to a screen of a user interface; a data detector configured to detect result data stored in a memory of a programmable logic controller according to an operation of a process equipment based on the blockchain configuration condition statement; a blockchain generator configured to generate blockchain data based on the result data detected from the memory of the programmable logic controller and to transmit the blockchain data to a plurality of client servers connected via the blockchain network; and a storage device configured to store the blockchain data and store blockchain data received from the client servers.

The data detector may be configured to detect the result data from a database of a legacy system that accumulates and stores data collected from the programmable logic controller. The data detector may be configured to periodically search data in the database of the legacy system using a database lookup query condition statement set by the blockchain condition setting device in response to the operator to detect updated result data of the memory of the programmable logic controller. The database lookup query condition statement may include at least one of a destination internet protocol, a port number, an access identification, an access password, a destination table, and lookup query.

The screen of the user interface may include data for accessing the programmable logic controller. The data for accessing the programmable logic controller may include destination internet protocol, a type of the programmable logic controller, and an operation condition determining OK data (e.g., satisfactory data) or no good data (e.g., unsatisfactory data) according to a specific value of a memory address of the programmable logic controller. The blockchain generator may be configured to generate the blockchain data when the memory of the programmable logic controller is updated. The client servers may include an in-house operation server and a server of an external cooperator.

The blockchain generator may be configured to analyze the blockchain data received from the client servers to extract node identification information, process information, collection information, a generation date, or result data according to an operation of a process equipment from the blockchain data. The blockchain generator may be configured to store the blockchain data in the storage device when the blockchain generator determines that the blockchain data are new result data. The blockchain generator may be configured to determine whether the blockchain data received from the client servers are redundant data stored in the storage device. Additionally, the blockchain generator may be configured to generate a forgery event when the blockchain data are redundant data.

The blockchain generator may be configured to alert the operator of an occurrence of the forgery event. The blockchain generator may be configured to transmit the blockchain data corresponding to the forgery event to the client servers via the blockchain network.

The blockchain generator may be configured to finally determine that forgery occurs in at least one of the client servers when the blockchain generator receives an event equal to the forgery event from at least one of the client servers. The blockchain generator may be configured to track the blockchain data corresponding to the forgery event. The programmable logic controller may be disposed corresponding to one process equipment or may be disposed corresponding to a plurality of process equipment.

An exemplary embodiment of the present disclosure may provide the method for operating the blockchain generation system, including: a) setting, by the blockchain generation system, a blockchain configuration condition statement and a database lookup query condition statement based on an operator's input to a screen of a user interface; b) monitoring, by the blockchain generation system, a memory of a programmable logic controller and a database of a legacy system that are installed in a process equipment based on the blockchain configuration condition statement and the database lookup query condition statement to collect result data updated from at least one of the memory and the database; c) generating, by the blockchain generation system, blockchain data based on the result data detected from the memory of the programmable logic controller to store the generated blockchain data in a storage device; and d) sharing, by the blockchain generation system, the generated blockchain data with a plurality of client servers by transmitting the blockchain data to the client servers connected to the server including the blockchain generation system through a blockchain network.

The method for operating the blockchain generation system may further include: e) after step d), receiving, by the blockchain generation system, blockchain data generated by one of the client servers via the blockchain network; f) analyzing, by the blockchain generation system, the blockchain data received from the client server to extract node identification information, process information, collection information, a generation date, or result data according to an operation of a process equipment from the blockchain data; and g) storing, by the blockchain generation system, the blockchain data in the storage device in response to the blockchain generation system determining that the blockchain data are new result data.

In particular, step f) may include: determining, by the blockchain generation system, whether the blockchain data received from the client server are redundant data stored in the storage device; generating, by the blockchain generation system, a forgery event when the blockchain data are redundant data; alerting, by the blockchain generation system, an operator of an occurrence of the forgery event; and transmitting, by the blockchain generation system, the blockchain data corresponding to the forgery event to the client servers via the blockchain network. Additionally, step f) may include: tracking, by the blockchain generation system, the blockchain data corresponding to the forgery event.

The method for operating the blockchain generation system may further include: after the blockchain data corresponding to the forgery event to the client servers via the blockchain network, finally determining, by the blockchain generation system, that forgery occurs in at least one of the client servers when the blockchain generation system receives an event equal to the forgery event from at least one of the client servers.

The blockchain generation system and the method for operating the same according to the exemplary embodiment of the present disclosure may generate the blockchain data by detecting data based on the condition statement in the PLC memory of the process equipment where all data according to an operation of the process equipment are stored, and may propagate or transmit the blockchain data to a plurality of node servers in the blockchain network. Thus, the blockchain data may be shared to thus detect forgery or falsification of the blockchain data.

Further, the exemplary embodiment of the present disclosure may monitor the result data according to an operation of equipment for each process in real time and may propagate a forgery event or a falsification event indicating that the result data are arbitrarily modified through the blockchain network. Thus, it may be possible to prevent an operator from arbitrarily forging or falsifying the result data in advance. In addition, the exemplary embodiment of the present disclosure may prevent defects in various types of parts required for production of a vehicle and a defect in an assembly process of the vehicle and may detect a cause of the defects. Thus, quality of the vehicle and reliability of a customer of the vehicle may be improved.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present invention, and wherein.

DETAILED DESCRIPTION

Figure 1:
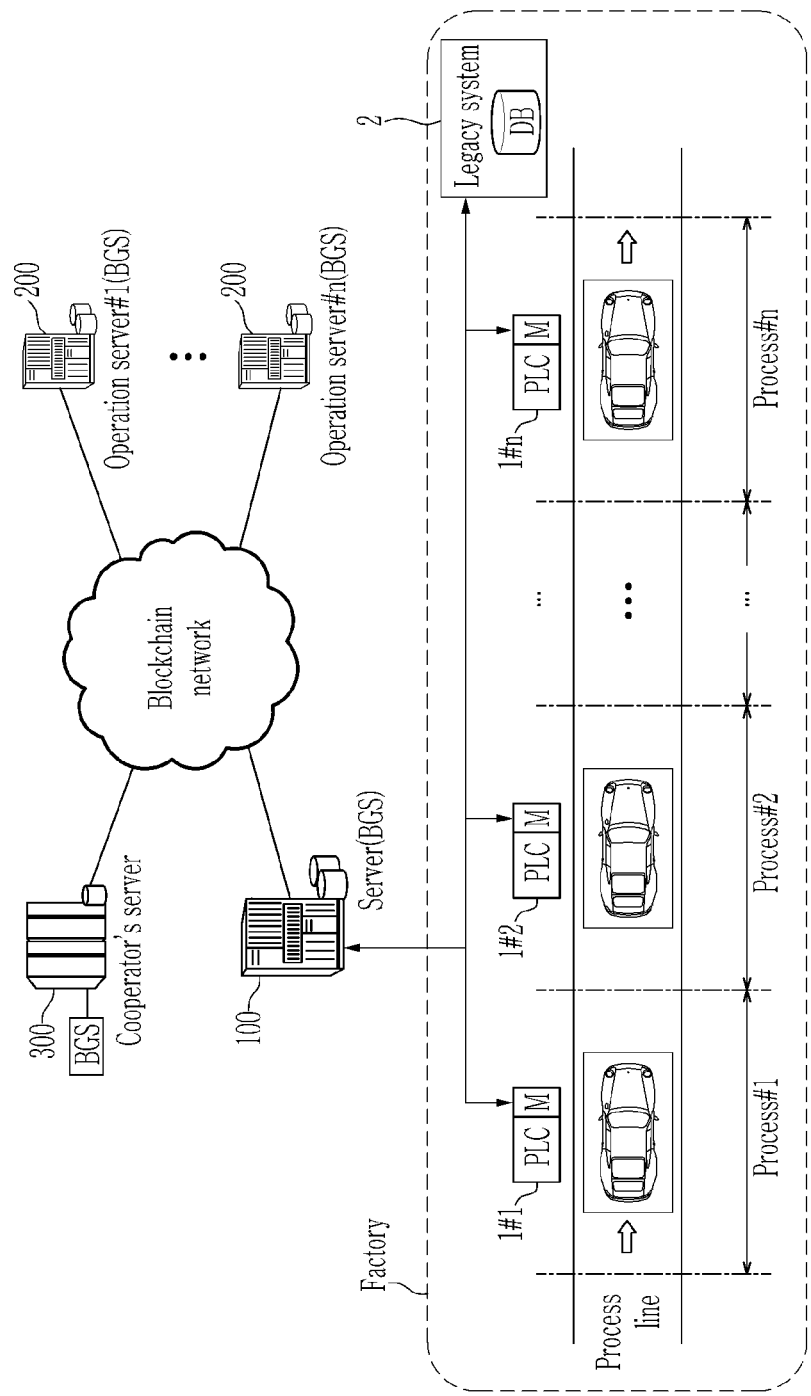
FIG. 1 is a network configuration diagram in which a blockchain generation system according to an exemplary embodiment of the present disclosure is applied to an industrial site.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, terms such as "first", "second", "A", "B", etc. may be used to describe various elements, but the elements should not be limited by the terms. These terms are intended to distinguish one element from other elements, but the nature and the order or sequence of the elements is not limited by those terms.

Throughout the specification, when an element is referred to as being "connected" or "accessed" to another element, not only may the element be directly connected or accessed to the other element, but an additional element may exist between therebetween. However, when an element is referred to as being "directly connected" or "directly accessed" to another element, there is no additional element therebetween.

A blockchain generation system (or a blockchain generation device) and a method for operating the same according to an exemplary embodiment of the present disclosure will now be described in detail with reference to the drawings. The blockchain generation system according to an exemplary embodiment of the present disclosure may be realized as a method for transmitting basic data of industrial equipment to a blockchain network by continuously monitoring the basic data and a method regarding a condition for monitoring process equipment.

Figure 2:
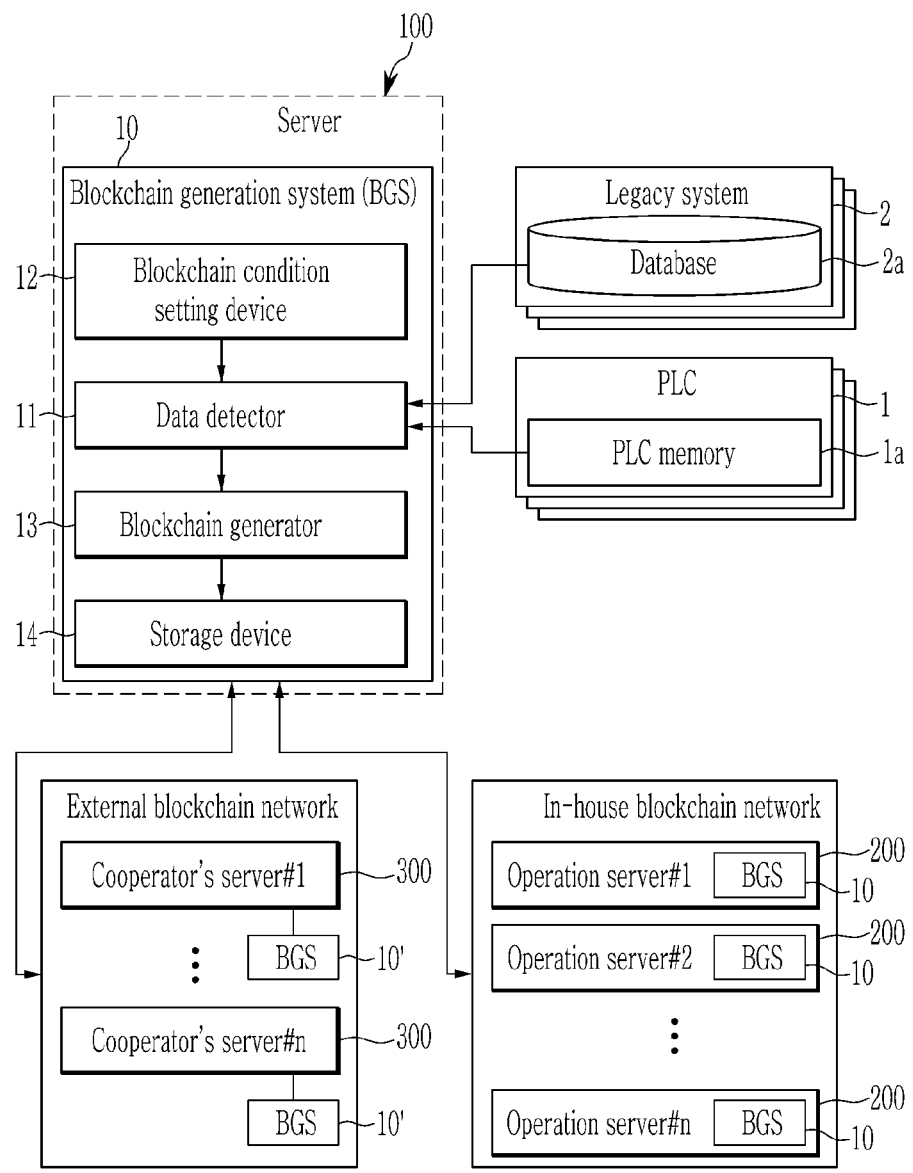
FIG. 2 is a block diagram showing a configuration of the blockchain generation system according to an exemplary embodiment of the present disclosure.

FIG. 1 is a network configuration diagram in which the blockchain generation system according to an exemplary embodiment of the present disclosure is applied to an industrial site. FIG. 2 is a block diagram showing a configuration of the blockchain generation system according to an exemplary embodiment of the present disclosure.

Referring to FIG. 1 and FIG. 2, a blockchain generation system (BGS) 10 according to an exemplary embodiment of the present disclosure may be included in a server 100 configured to manage an operation of a programmable logic controller (PLC) 1 disposed for each process along a process line of the industrial site or a factory. The server 100 may be configured to manage a production line of the factory. The PLC 1 may be included in a process equipment. The blockchain generation system (BGS) 10 may be included in a plurality of in-house operation servers 200 and a plurality of servers 300 of the external cooperators that are connected to the server 100 via the blockchain network.

The blockchain generation system 10 may allow each of the servers 100, 200, and 300 to operate as a server and a client. Each of the servers 100, 200, and 300 may be one node included in the blockchain network. The in-house operation servers 200 and the server 300 of the external cooperator may be referred to as a client server or a node server.

The blockchain generation system 10 may be realized as hardware, software, or a combination of hardware and software. In the server 300 of the external cooperator, the blockchain generation system may be realized as a separate terminal-type BGS 10' connected to the server 300 via a communication interface. The BGS 10' may support the server 300 with a poor system environment, and may be configured to transmit only result data for blockchain interworking.

As shown in FIG. 1, the server 100 may be configured to store data generated by checking a state of a memory of the PLC 1 disposed along the process line in the blockchain network in real time. The PLC 1 may be installed in each process equipment of the process line.

A plurality of the programmable logic controllers (PLCs) 1 may be installed along the process line of the factory (e.g., a factory for producing a vehicle). The PLC 1 may be configured to store result data generated according to equipment operation and inspection for assembling the vehicle in a memory 1a of the PLC. Since the result data includes all data of the process equipment, all changes of the factory or an industrial equipment may be tracked when the result data are stored in the blockchain network. For example, forgery or falsification of the result data may occur when inspection data (e.g., OK data or no good (NG) data) is arbitrarily changed, a state of a sample or a product introduced into the process equipment is changed, or an error of the process equipment occurs.

The PLC memory 1a may be configured to store the result data including at least one of log data, control data, measurement data, and inspection data collected according to an operation of the process equipment. A legacy system 2 may include a database (DB) 2a that accumulates data collected from the PLCs 1 according to production management in the factory and stores the accumulated data. A plurality of legacy systems 2 may be installed in the factory.

The database (DB) 2a may be configured in an environment such as Oracle or MS-SQL, and may support data lookup or data inquiry based on query condition statement. The BGS 10 may include a data detector 11, a blockchain condition setting device 12, a blockchain generator 13, and a storage device 14. The server 100 including the BGS 10 may be configured to perform a function such as data processing, communication, computing, and user interface (UI).

The data detector 11 may be configured to monitor a state of the PLC memory 1a to detect real-time result data updated according to an operation of the PLC 1. The data detector 11 may define a blockchain configuration condition statement for detecting the result data for generating blockchain, and may use the blockchain configuration condition statement to detect the real time result data. The data detector 11 may be configured to periodically search data in the DB 2a of the legacy system 2 using a database (DB) lookup query condition statement to detect updated result data of the PLC memory 1a.

Figure 3A:
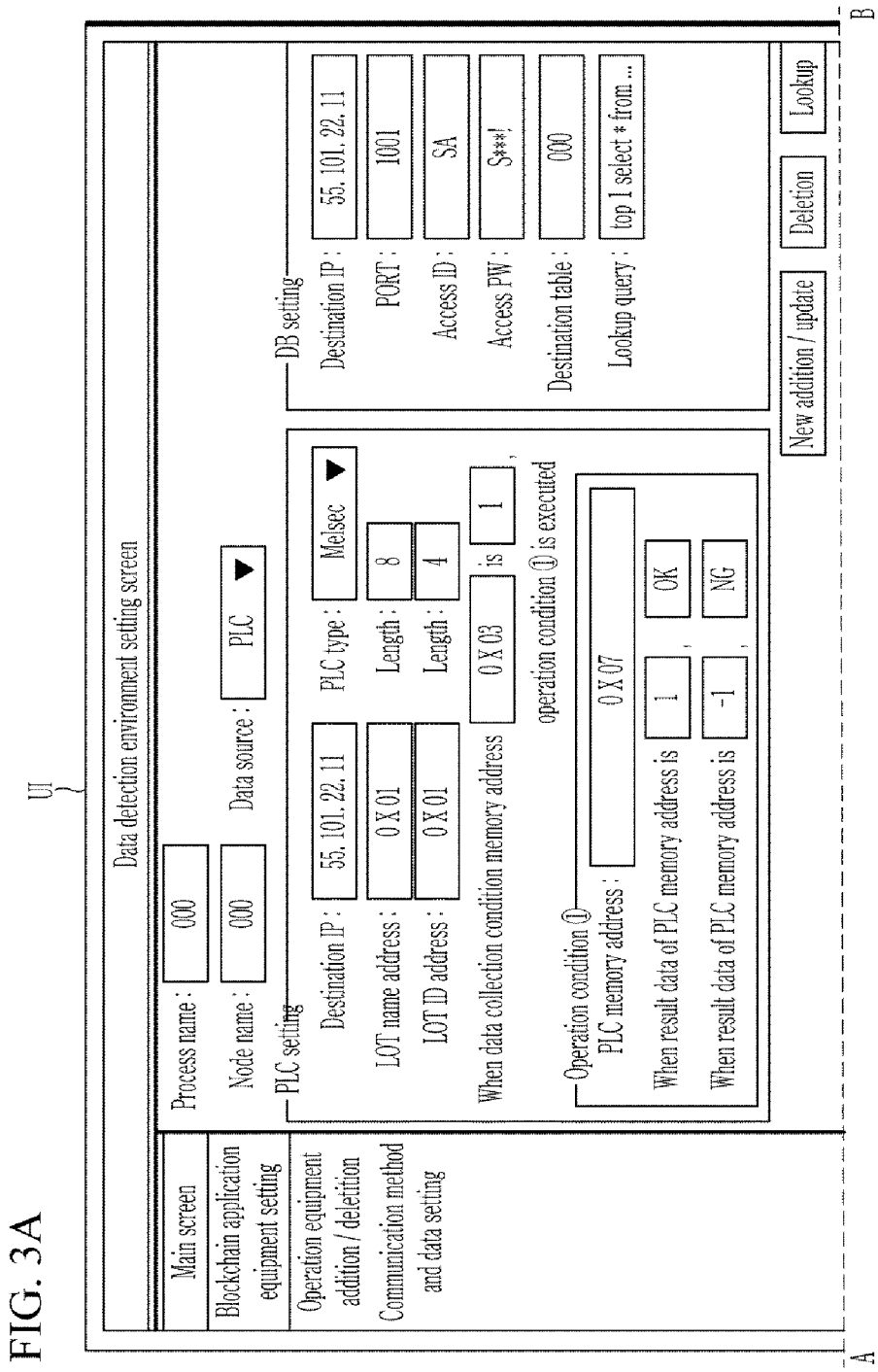
FIG. 3A and FIG. 3B show a data detection environment setting screen of a data detector according to an exemplary embodiment of the present disclosure.
Figure 3B:
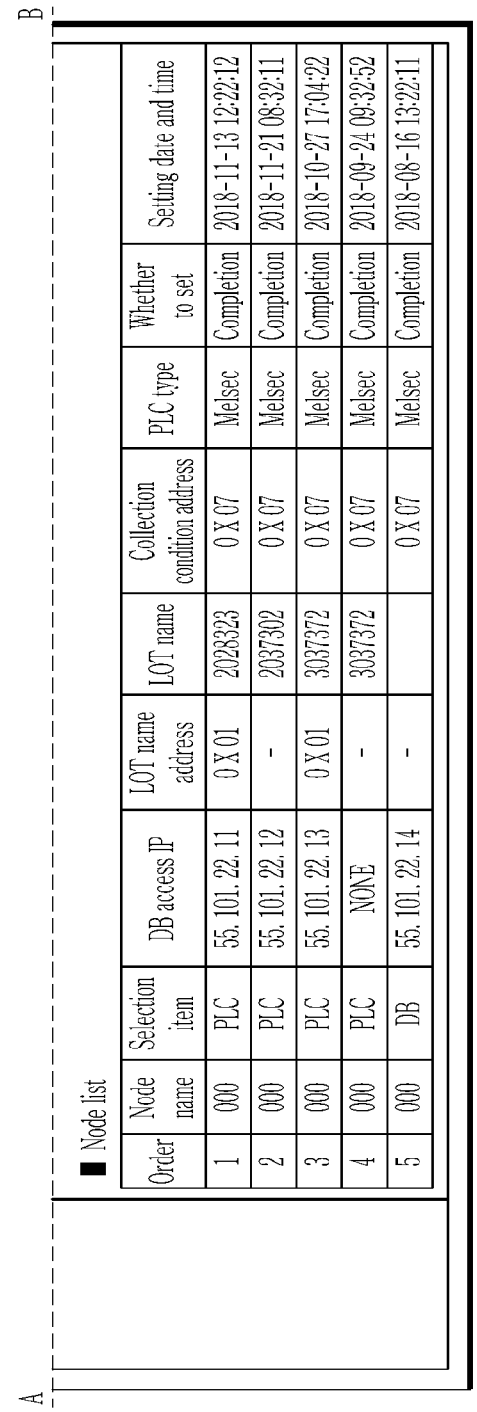

FIG. 3A and FIG. 3B show a data detection environment setting screen of the data detector according to an exemplary embodiment of the present disclosure. FIGS. 3A and 3B are combined to form one screen. Referring to FIG. 1, FIG. 3A, and FIG. 3B, the data detector 11 may include a user interface (UI) corresponding to the data detection environment setting screen, and may set the equipment and a communication method to which the blockchain is applied based on the user interface (UI).

Data for accessing the PLC 1 and the DB of the legacy system 2 may be input to a screen of the UI by an operator. For example, the data for accessing the PLC 1 may include a destination internet protocol (IP) (or destination internet protocol address), a type of the PLC, and an operation condition determining OK data or no good (NG) data according to a specific value of a memory address of the PLC.

A specific DB may be searched by the data for accessing the DB of the legacy system 2, and a value stored in the searched DB may be transmitted to the blockchain network. The data for accessing the DB of the legacy system 2 may be determined by the DB lookup query condition statement set by the operator. For example, the DB lookup query condition statement may include a destination IP, a port number, an access identification (ID), an access password (PW), a destination table, or lookup query.

The blockchain condition setting device 12 may be configured to set the blockchain configuration condition statement and the DB lookup query condition statement according to the operator's input setting for the UI screen, and may be configured to store the blockchain configuration condition statement and the DB lookup query condition statement so that the blockchain generator 13 uses the stored blockchain configuration condition statement and DB lookup query condition statement to generate blockchain data (or blockchain).

An operation condition of the blockchain generator 13 may be changed according to an input setting condition for the UI screen. The blockchain generator 13 may be configured to continuously monitor the PLC 1 to generate the blockchain data when the PLC memory 1a is updated (e.g., data of the PLC memory 1a is changed). The blockchain generator 13 may be configured to generate the blockchain data based on the result data detected from the PLC memory 1a and the DB 2a of the legacy system according to the set blockchain configuration condition statement and the set DB lookup query condition statement. The blockchain data may include node identification information, process information, collection information, a generation date, or the result data.

The blockchain generator 13 may be configured to propagate or transmit the generated blockchain data to the operation server 200 and the server 300 of the external cooperator to share the blockchain data between the blockchain generator, the operation server, and the server of the external cooperator. The storage device 14 may be configured to store various programs and data for an operation of the BGS 10, and store data generated according to the operation of the BGS 10. The storage device 14 may also be configured to store the generated blockchain data, and may store blockchain data received from the client server.

The BGS 10 may be configured to share the continuously generated blockchain data with all nodes in the blockchain network using a distributed data storage technology. Thus, the blockchain data may not be arbitrarily manipulated by an operator of the distributed node. It was described in the above description that the BGS 10 generates the blockchain data and propagates the blockchain data to the client server. However, in another exemplary embodiment of the present disclosure, the BGS 10 may be configured to receive blockchain data generated by the client servers 200 and 300.

The blockchain generator 13 may be configured to analyze the blockchain data received from the client servers 200 and 300 to extract node identification information, process information, collection information, a generation date, or result data according to an operation of a process equipment from the blockchain data. When the blockchain generator 13 determines that the blockchain data are new result data, the blockchain generator may be configured to store the blockchain data in the storage device 14.

The blockchain generator 13 may be configured to analyze the blockchain data received from the client servers 200 and 300 to determine whether the blockchain data are redundant data stored in the storage device 14 instead of new result data. When the blockchain data are determined to be redundant data, the blockchain generator 13 may be configured to generate a forgery event or a falsification event.

The blockchain generator 13 may be configured to alert the operator of the forgery event or the falsification event, and transmit the blockchain data corresponding to the forgery event or the falsification event to the client servers 200 and 300 via the blockchain network. The blockchain generator 13 may be configured to finally determine that forgery has occurred in at least one of the client servers 200 and 300 when the blockchain generator receives an event equal to the forgery event or the falsification event from at least one of the client servers 200 and 300. Thus, forgery or falsification of the result data in the industrial site may be prevented by tracking the blockchain data corresponding to the forgery event using the blockchain generator 13.

Since the BGS 10 stores all data arbitrarily changed by the operator using the result data, the BGS may be configured to track all forgery matters. The BGS 10 may be configured to check the result data of the PLC memory 1a based on the condition statement. Therefore, the operator may check an entire memory area of the PLC memory 1a according to the condition statement setting. The BGS 10 may be configured to generate the blockchain data by periodically checking or inquiring the result data of the DB 2a of the legacy system 2 using the query condition statement.

Since the BGS 10 continuously monitors data stored in the DB 2a using the query condition statement to generate the blockchain data, the BGS 10 may be configured to verify whether the data stored in the DB 2a is forged by comparing the forged data with the blockchain data. The blockchain data may be the result data of the PLC 1 stored in the legacy system 2.

Figure 4:
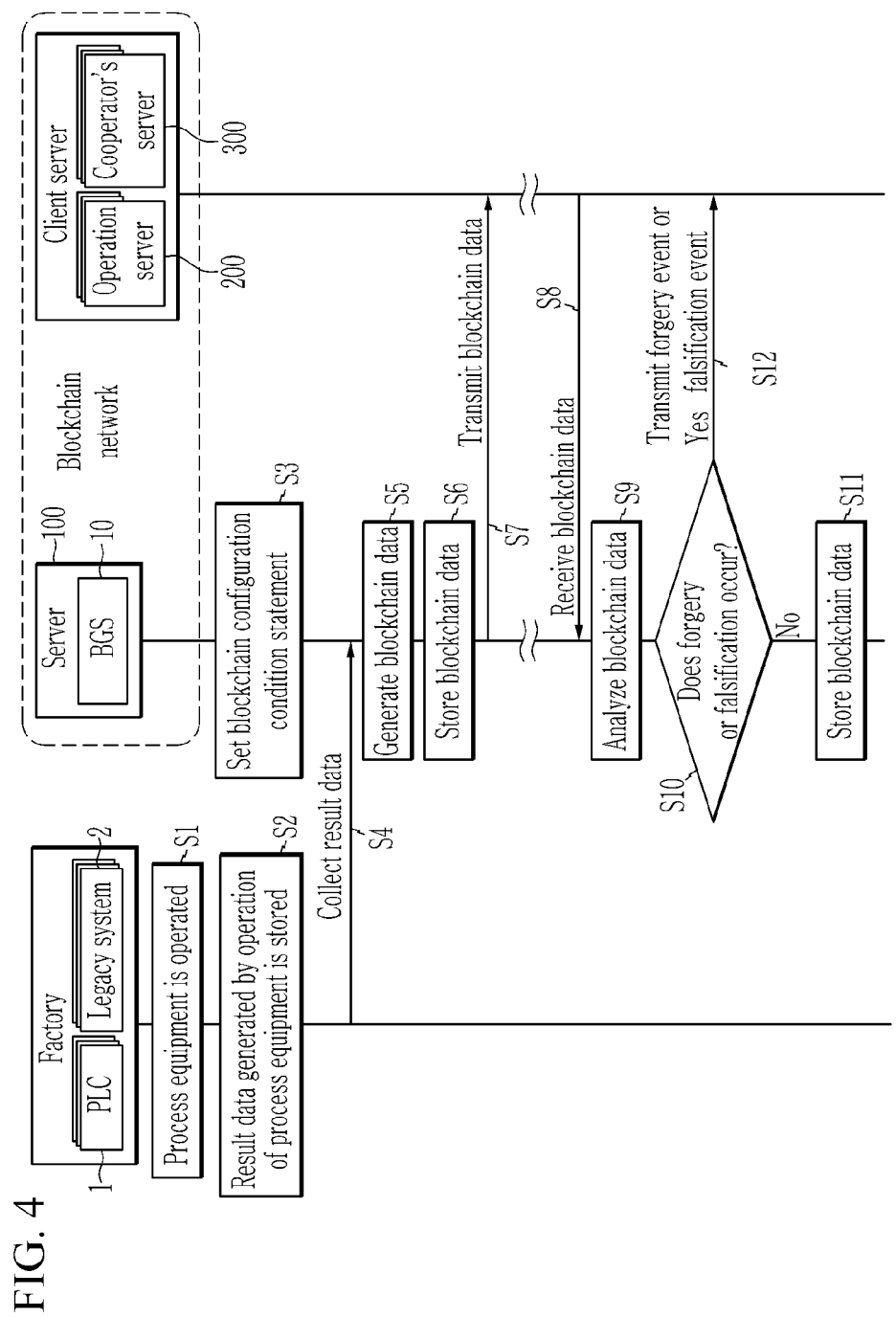
FIG. 4 is a flowchart showing a method for operating the blockchain generation system according to an exemplary embodiment of the present disclosure.

A method for operating the blockchain generation system according to an exemplary embodiment of the present disclosure will be described in detail based on the blockchain network implemented using the BGS 10. FIG. 4 is a flowchart showing the method for operating the blockchain generation system according to an exemplary embodiment of the present disclosure. Referring to FIG. 4, the process equipment installed in the industrial site or the factory according to an exemplary embodiment of the present disclosure is operated (step S1).

The PLC 1 may be configured to store the result data generated by an operation of the process equipment in the PLC memory 1a (step S2). The legacy system 2 may be configured to collect the result data according to the operation of the equipment from a plurality of PLCs 1 and store the collected result data in the DB 2a (step S2). The BGS 10 installed in server 100 may be configured to set the blockchain configuration condition statement and the DB lookup query condition statement according to an input of the operator, and store the set condition statements to generate the blockchain data using the condition statements (step S3).

The BGS 10 may be configured to monitor the PLC memory 1a of the PLC 1 and the DB 2a of the legacy system 2 that are installed in the process equipment to collect the result data updated from at least one of the PLC memory 1a and the DB 2a (step S4). The BGS 10 may be configured to detect the result data from the PLC memory 1a and the DB 2a of the legacy system 2 based on the blockchain configuration condition statement and the DB lookup query condition statement.

The BGS 10 may be configured to generate the blockchain data by detecting the result data based on the condition statements (step S5), and store the generated blockchain data in the storage device 14 (step S6). The stored blockchain data may include node identification information, process information, collection information, a generation date, or the result data. The BGS 10 may be configured to share the generated blockchain data with the client servers by transmitting or propagating the blockchain data to the client servers including the operation server 200 and the server 300 of the external cooperator connected to the blockchain network (step S7).

The client servers 200 and 300 that are connected to the blockchain network and include the BGS may be configured to perform the steps S3 through S7 steps as the server 100, and transmit their own blockchain data through the blockchain network. Therefore, the BGS 10 of the server 100 may be configured to receive the blockchain data generated by either the operation server 200 or the server 300 of the external cooperator through the blockchain network (step S8).

The BGS 10 may be configured to analyze the blockchain data received from the client server to extract node identification information, process information, collection information, a generation date, or the result data according to an operation of the process equipment (step S9). The BGS 10 may be configured to compare the extracted data with data stored in the BGS 10 to determine whether the extracted data are redundant data, determine that the extracted data are new data that has not been forged when the extracted data are not redundant data (NO in step S10), and store the blockchain data in the storage device 14 (step S11).

The BGS 10 may be configured to determine that forgery or falsification occurs in response to detecting that the extracted data are redundant data (Yes in step S10). The BGS 10 may be configured to alert the operator of the forgery event or the falsification event, and transmit or propagate the forgery event or the falsification event to the client servers 200 and 300 through the blockchain network (step S12). The BGS 10 may be configured to finally determine that forgery has occurred in at least one of the client servers 200 and 300 when the blockchain generator receives an event equal to the forgery event or the falsification event from at least one of the client servers 200 and 300.

The subject or a main agent of the method for operating the blockchain generation system may be the BGS 10 or the server 100. The exemplary embodiment of the present disclosure generate the blockchain data by detecting data based on the condition statement in the PLC memory of the process equipment where all data according to an operation of the process equipment are stored, and propagate or transmit the blockchain data to a plurality of the client servers in the blockchain network. Thus, the blockchain data may be shared to detect forgery or falsification of the blockchain data.

Further, the exemplary embodiment of the present disclosure may monitor the result data according to an operation of equipment for each process in real time and propagate the forgery event or the falsification event indicating that the result data are arbitrarily modified through the blockchain network. Thus, it may be possible to prevent the operator from arbitrarily forging or falsifying the result data in advance. In addition, the exemplary embodiment of the present disclosure may prevent defects in various types of parts required for production of the vehicle and a defect in an assembly process of the vehicle and may find a cause of the defects. Thus, quality of the vehicle and reliability of a customer of the vehicle may be improved.

Figure 5:
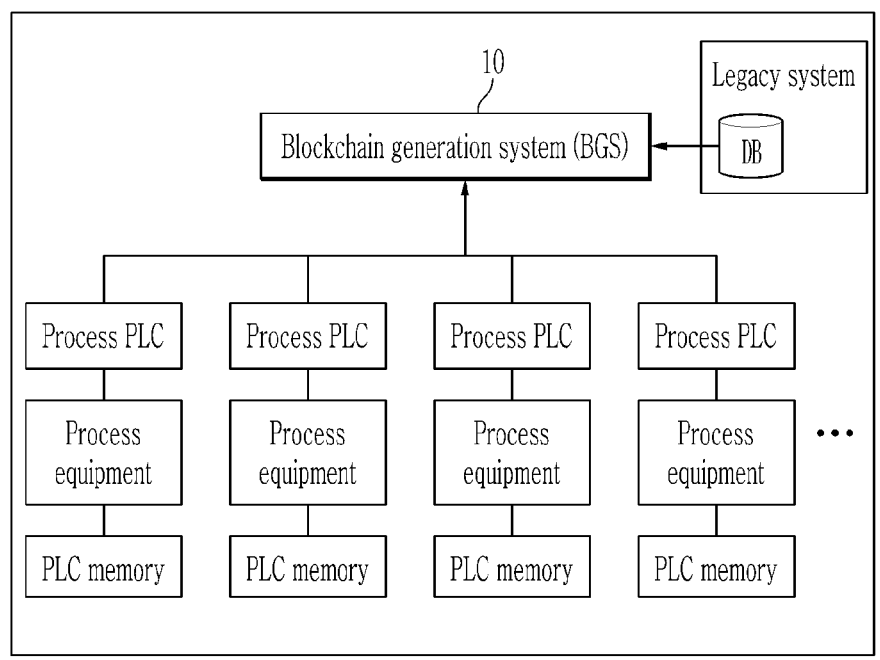
FIG. 5 shows a data collection method for industrial equipment according to an exemplary embodiment of the present disclosure.
Figure 6:
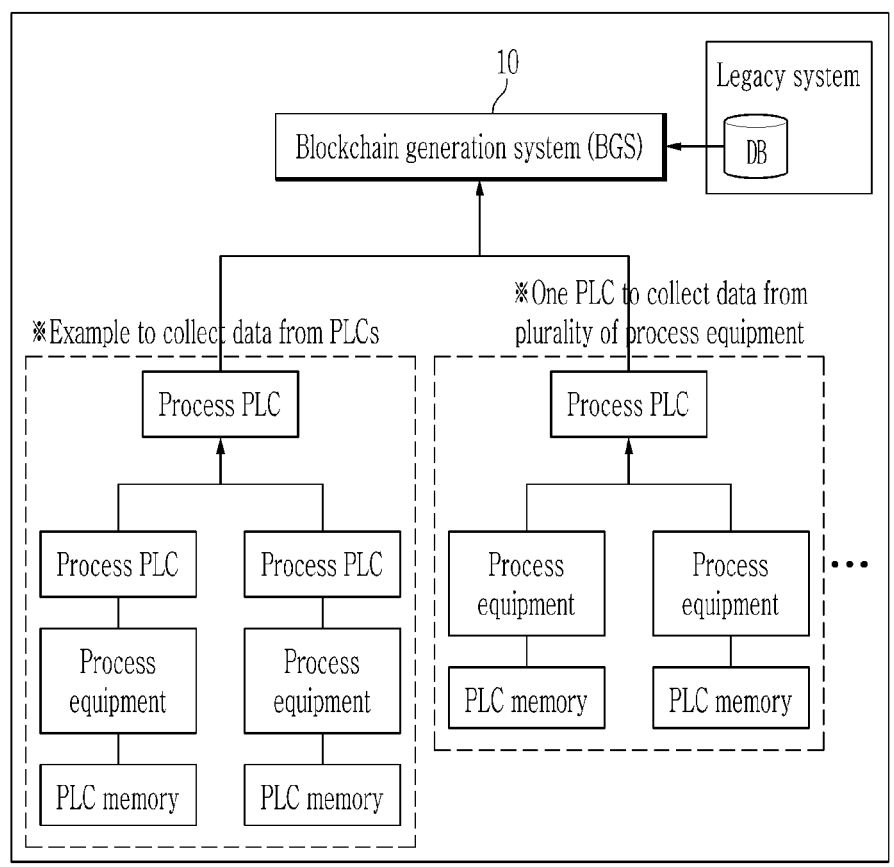
FIG. 6 shows a data collection method for the industry equipment according to another exemplary embodiment of the present disclosure.

The exemplary embodiment of the present disclosure may be applied to a method for collecting data of the process equipment. FIG. 5 shows the data collection method for the industrial equipment according to an exemplary embodiment of the present disclosure. FIG. 6 shows the data collection method for the industry equipment according to another exemplary embodiment of the present disclosure.

Referring to FIG. 5, one process equipment may be disposed corresponding to one PLC. An arrangement of the process equipment and the PLC of FIG. 5 is similar to an arrangement of the process equipment and the PLC of FIG. 1. Referring to FIG. 6, one process equipment may be disposed corresponding to a plurality of PLCs or a plurality of process equipment may be disposed corresponding to one PLC.

When one process equipment is disposed corresponding to the plurality of PLCs, one PLC may be configured to collect data of a plurality of PLCs to transmit the collected data to the BGS 10. When the plurality of process equipment is disposed corresponding to one PLC, an installation cost of the PLC and a data collection path may be reduced. The exemplary embodiment of the present disclosure may be applied to a method for monitoring and tracking forgery of various data generated within a company.

The exemplary embodiment of the present disclosure is not implemented only by the aforementioned apparatus and/or method, and may be implemented by a program for operating a function corresponding to the configuration of the exemplary embodiment of the present disclosure, a recording medium in which the program is recorded, and the like, and the implementation may be easily realized from the description of the aforementioned exemplary embodiment by those skilled in the art.

While this disclosure has been described in connection with what is presently considered to be practical exemplary embodiments, it is to be understood that the disclosure is not limited to the disclosed exemplary embodiments, but, on the contrary, is intended to cover various modifications and equivalent arrangements included within the spirit and scope of the appended claims.

DESCRIPTION OF SYMBOLS

1: PLC
1a: PLC memory

2: legacy system
2a: DB
100: server
10: BGS
11: data detector
12: blockchain condition setting device
13: blockchain generator
14: storage device

What is claimed is:

1. A blockchain generation system included in each of servers forming a blockchain network, comprising:
a blockchain condition setting device configured to set a blockchain configuration condition statement based on an operator's input to a screen of a user interface;
a data detector configured to detect result data stored in a memory of a programmable logic controller according to an operation of a process equipment based on the blockchain configuration condition statement;
a blockchain generator configured to generate blockchain data based on the result data detected from the memory of the programmable logic controller and to transmit the blockchain data to a plurality of client servers connected via the blockchain network; and
a storage device configured to store the blockchain data and store blockchain data received from the client servers,
wherein the client servers include an in-house operation server and a server of an external cooperator;
wherein the blockchain generator is further configured to:
analyze the blockchain data received from the client servers to extract node identification information, process information, collection information, a generation date, or result data according to an operation of a process equipment from the blockchain data;
store the blockchain data in the storage device in response to determining that the blockchain data are new result data;
determine whether the blockchain data received from the client servers are redundant data stored in the storage device; and
generate a forgery event in response to determining that the blockchain data are redundant data.

2. The blockchain generation system of claim 1, wherein the data detector is configured to detect the result data from a database of a legacy system that accumulates and stores data collected from the programmable logic controller.

3. The blockchain generation system of claim 2, wherein the data detector is configured to periodically search data in the database of the legacy system using a database lookup query condition statement set by the blockchain condition setting device in response to the operator to detect updated result data of the memory of the programmable logic controller.

4. The blockchain generation system of claim 3, wherein the database lookup query condition statement includes at least one of a destination internet protocol, a port number, an access identification, an access password, a destination table, and lookup query.

5. The blockchain generation system of claim 1, wherein the screen of the user interface includes data for accessing the programmable logic controller, and wherein the data for accessing the programmable logic controller includes destination internet protocol, a type of the programmable logic controller, and an operation condition determining OK data or no good data according to a specific value of a memory address of the programmable logic controller.

6. The blockchain generation system of claim 1, wherein the blockchain generator is configured to generate the blockchain data when the memory of the programmable logic controller is updated.

7. The blockchain generation system of claim 1, wherein the blockchain generator is configured to:
alert the operator of an occurrence of the forgery event; and
transmit the blockchain data corresponding to the forgery event to the client servers via the blockchain network.

8. The blockchain generation system of claim 7, wherein the blockchain generator is configured to finally determine that forgery occurs in at least one of the client servers in response to receiving an event equal to the forgery event from at least one of the client servers.

9. The blockchain generation system of claim 1, wherein the blockchain generator is configured to track the blockchain data corresponding to the forgery event.

10. The blockchain generation system of claim 1, wherein the programmable logic controller is disposed corresponding to one process equipment or is disposed corresponding to a plurality of process equipment.

11. A method for operating a blockchain generation system included in a server managing a production line of a factory, comprising:
a) setting, by the blockchain generation system, a blockchain configuration condition statement and a database lookup query condition statement based on an operator's input to a screen of a user interface;
b) monitoring, by the blockchain generation system, a memory of a programmable logic controller and a database of a legacy system that are installed in a process equipment based on the blockchain configuration condition statement and the database lookup query condition statement to collect result data updated from at least one of the memory and the database;
c) generating, by the blockchain generation system, blockchain data based on the result data detected from the memory of the programmable logic controller to store the generated blockchain data in a storage device;
d) sharing, by the blockchain generation system, the generated blockchain data with a plurality of client servers by transmitting the blockchain data to the client servers connected to the server including the blockchain generation system through a blockchain network;
e) receiving, by the blockchain generation system, blockchain data generated by one of the client servers via the blockchain network;
f) analyzing, by the blockchain generation system, the blockchain data received from the client server to extract node identification information, process information, collection information, a generation date, or result data according to an operation of a process equipment from the blockchain data; and
g) storing, by the blockchain generation system, the blockchain data in the storage device when the blockchain generation system determines that the blockchain data are new result data
wherein the analysis of the blockchain data includes:
determining, by the blockchain generation system, whether the blockchain data received from the client server are redundant data stored in the storage device;
generating, by the blockchain generation system, a forgery event in response to determining that the blockchain data are redundant data;

alerting, by the blockchain generation system, an operator of the forgery event; and transmitting, by the blockchain generation system, the blockchain data corresponding to the forgery event to the client servers via the blockchain network.

12. The method of claim 11, wherein the analysis of the blockchain data includes:

tracking, by the blockchain generation system, the blockchain data corresponding to the forgery event.

13. The method of claim 11, further comprising:

finally determining, by the blockchain generation system, that forgery occurs in at least one of the client servers in response to receiving an event equal to the forgery event from at least one of the client servers.

* * * * *